United States Patent
Clucas (10) Patent No.: US 11,259,036 B2
(45) Date of Patent: Feb. 22, 2022

(54) VIDEO DECODER CHIPSET

(71) Applicant: V-NOVA INTERNATIONAL LIMITED, London (GB)

(72) Inventor: Richard Clucas, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 17/050,723

(22) PCT Filed: Apr. 18, 2019

(86) PCT No.: PCT/GB2019/051104
§ 371 (c)(1),
(2) Date: Oct. 26, 2020

(87) PCT Pub. No.: WO2019/207286
PCT Pub. Date: Oct. 31, 2019

(65) Prior Publication Data
US 2021/0120258 A1     Apr. 22, 2021

(30) Foreign Application Priority Data

Apr. 27, 2018   (GB) ...................................... 1806926

(51) Int. Cl.
*H04N 19/42*      (2014.01)
*H04N 19/33*      (2014.01)
(Continued)

(52) U.S. Cl.
CPC ............... *H04N 19/42* (2014.11); *G06F 5/01* (2013.01); *G06F 7/32* (2013.01); *H04N 19/33* (2014.11); *H04N 19/85* (2014.11)

(58) Field of Classification Search
CPC ........ H04N 19/42; H04N 19/85; H04N 19/33; G06F 7/32; G06F 5/01
See application file for complete search history.

(56) References Cited

U.S. PATENT DOCUMENTS 9,509,990 B2 *  11/2016  Rossato ................. H04N 19/63
2014/0153642 A1 *  6/2014  Hattori ................ H04N 19/159
                                                           375/240.03
(Continued)

OTHER PUBLICATIONS

Search Report and Written Opinion for PCT/GB2019/051104 dated Jul. 23, 2019.

*Primary Examiner* — Tracy Y. Li
(74) *Attorney, Agent, or Firm* — Workman Nydegger (57) ABSTRACT

A video decoder chipset (200, 300, 400, 500) comprises a video decoder function (210), an upscaler function (230) and a combiner function (240). The video decoder function (210) is configured to (i) decode encoded video data to generate decoded video data at a first level of quality, the encoded video data having been derived by an encoder using first video data at a second, higher level of quality and (ii) output the decoded video data for storage in a memory (220). The upscaler function (230) is configured to (i) obtain the decoded video data from the memory (220) and (ii) upscale the obtained decoded video data to generate second video data at the second level of quality. The combiner function (240) is configured to (i) obtain residual data, the residual data having been derived by the encoder based on the first video data and the second video data, (ii) combine the second video data with the residual data to generate enhanced video data, and (iii) output the enhanced video data.

20 Claims, 5 Drawing Sheets

(51) Int. Cl.
*H04N 19/85* (2014.01)
*G06F 5/01* (2006.01)
*G06F 7/32* (2006.01)

(56) References Cited

U.S. PATENT DOCUMENTS

| | | |
|---|---|---|
| 2014/0226710 A1 | 8/2014 | Park et al. |
| 2015/0023404 A1* | 1/2015 | Li ................... H04N 19/152 375/240.02 |
| 2015/0195587 A1* | 7/2015 | Tsukagoshi ........ H04N 21/4345 725/116 |
| 2016/0134869 A1* | 5/2016 | Ikai ................. H04N 19/136 382/166 |
| 2017/0026659 A1* | 1/2017 | Lin .................. H04N 19/426 |
| 2017/0223368 A1 | 8/2017 | Abbas et al. |

\* cited by examiner

VIDEO DECODER CHIPSET

This application is a 371 U.S. Nationalization of PCT Application No. PCT/GB2019/051104, filed Apr. 18, 2019, which claims priority to Great Britain Application No. 1806926.0, filed Apr. 27, 2018, the disclosures of which are incorporated by reference herein in their entireties.

TECHNICAL FIELD

This invention relates to a video decoder chipset.

BACKGROUND

In some situations, it is desired to display a video to a viewer at a relatively high level of quality, for example at a relatively high resolution. This may be desirable where the screen on which the video is displayed is very close to the viewer, for example in immersive video (e.g. virtual reality (VR) and augmented reality (AR)) applications. The viewer may otherwise notice defects in a lower quality video. Such defects can detract from the viewer's enjoyment of and engagement with the video.

Videos may be stored and/or transmitted in a compressed form, for example by encoding the videos. However, in order to display such videos to a viewer at a sufficiently high level of quality, the videos may be decompressed, for example by decoding the videos. Decoding high quality videos may result in relatively large amounts of data being stored and/or processed and/or transmitted, particularly as the usage of higher quality, higher definition videos becomes more widespread. Storing decoded, high quality videos may be a particular consideration in systems that have a limited amount of memory. Other considerations relating to the decoding of high quality videos include processing power, latency, the capability of decoding components, cost and complexity.

SUMMARY

According to a first aspect of the present invention, there is provided a video decoder chipset comprising:
a video decoder function configured to:
decode encoded video data to generate decoded video data at a first level of quality, the encoded video data having been derived by an encoder using first video data at a second, higher level of quality; and
output the decoded video data for storage in a memory;
an upscaler function configured to:
obtain the decoded video data from the memory; and
upscale the obtained decoded video data to generate second video data at the second level of quality; and
a combiner function configured to:
obtain residual data, the residual data having been derived by the encoder based on the first video data and the second video data;
combine the second video data with the residual data to generate enhanced video data; and
output the enhanced video data.

According to a second aspect of the present invention, there is provided a method of processing video data in a video decoder chipset, the video decoder chipset comprising a video decoder function, an upscaler function and a combiner function, the method comprising:
decoding, by the video decoder function, encoded video data to generate decoded video data at a first level of quality, the encoded video data having been derived by an encoder using first video data at a second, higher level of quality;
outputting, by the video decoder function, the decoded video data for storage in a memory;
obtaining, by the upscaler function, the decoded video data from the memory;
upscaling, by the upscaler function, the obtained decoded video data to generate second video data at the second level of quality;
receiving, by the combiner function, residual data, the residual data having been derived by the encoder based on the first video data and the second video data;
combining, by the combiner function, the second video data with the residual data to generate enhanced video data; and
outputting, by the combiner function, the enhanced video data.

According to a third aspect of the present invention, there is provided a computer program comprising instructions which, when executed, cause a video decoder chipset to perform a method according to the second aspect.

According to a fourth aspect of the present invention, there is provided a computer-readable medium comprising a computer program according to the third aspect.

According to a fifth aspect of the present invention, there is provided a video decoder chipset comprising:
a 4K video decoder function configured to:
receive encoded 4K video data, the encoded 4K video data having been derived by an encoder device using first 8K video data;
decode the received encoded 4K video data to generate decoded 4K video data; and
output the decoded 4K video data;
a 4K-to-8K upscaler function configured to:
obtain the decoded 4K video data; and
upscale the obtained 4K decoded video data to generate second 8K video data; and
a combiner function configured to:
obtain residual data, the residual data having been derived by the encoder device based on the first 8K video data and video data corresponding to the second 8K video data;
combine the second 8K video data with the residual data to generate third 8K video data; and
output the third 8K video data.

Further features and advantages will become apparent from the following description of preferred embodiments, given by way of example only, which is made with reference to the accompanying drawings.

DETAILED DESCRIPTION

Figure 1:
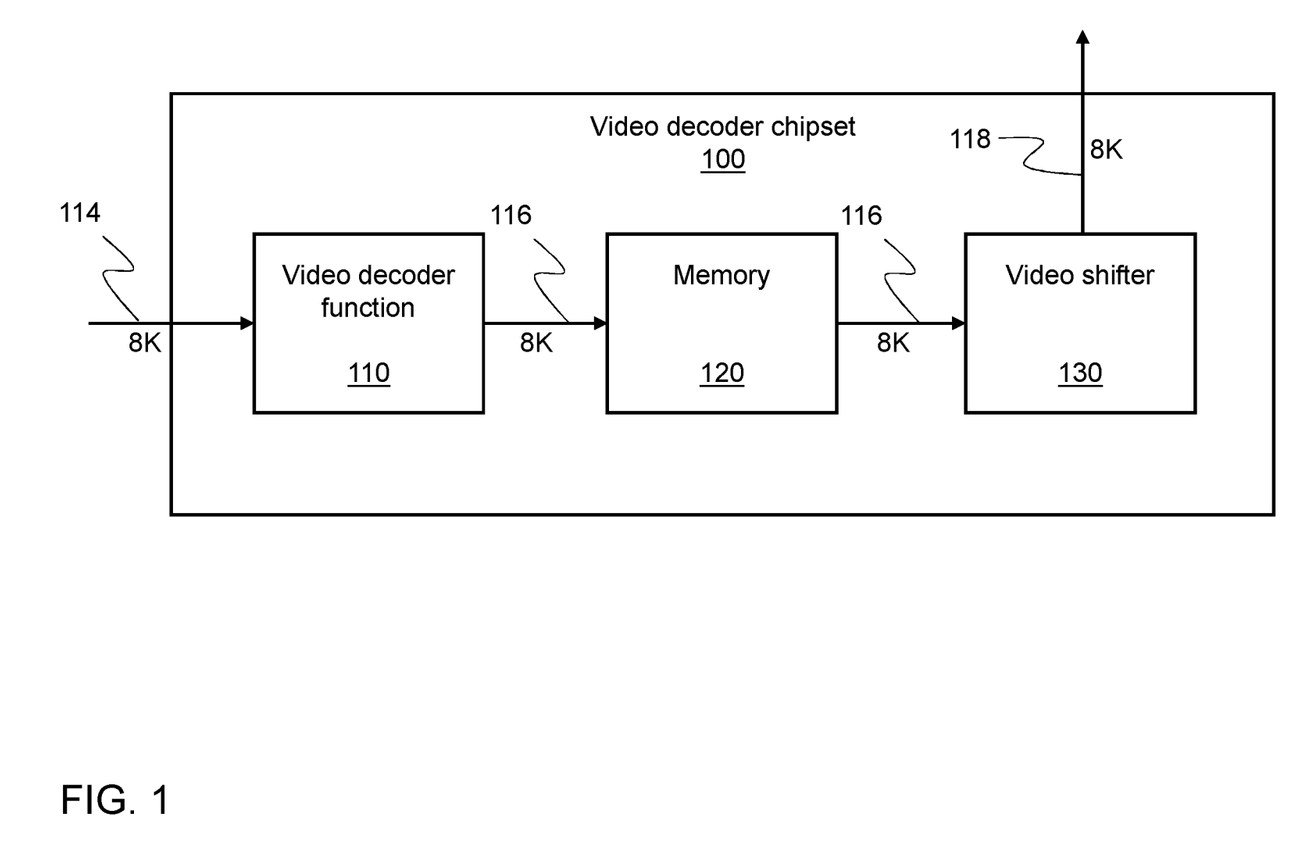
FIG. 1 shows a schematic block diagram of an example of a video decoder chipset.

Referring to FIG. 1, there is shown an example of a video decoder chipset 100. A video decoder chipset is an integrated circuit. The video decoder chipset 100 comprises a plurality of electrical components arranged to operate as a single unit. The video decoder chipset 100 is an application-specific integrated circuit (ASIC), namely an integrated circuit arranged to have a particular application or perform one or more specific tasks which in this case includes decoding video data. As will be explained in more detail below, a video decoder chipset may perform other functions in addition to decoding video data.

The video decoder chipset 100 may be comprised in a computing device (not shown). Examples of types of computing device include, but are not limited to, mobile computing devices, televisions, set-top boxes and personal computers. Examples of mobile computing devices include, but are not limited to, mobile (or 'cellular') telephones (for example smartphones), portable computers (for example laptops and tablet devices), and wearable devices (for example headsets and watches). The video decoder chipset 100 may be arranged on a motherboard or expansion card of the computing device or may be provided in another manner. The video decoder chipset 100 is, in use, communicatively coupled to one or more other components of the computing device. For example, the video decoder chipset 100 may be communicatively coupled to a central processing unit (CPU) of the computing device, a memory of the computing device, and/or one or more peripherals of the computing device. An example of a peripheral is a display device.

In some examples, the computing device comprises a VR device configured to process VR video data. Examples of VR devices include, but are not limited to, VR headsets and VR goggles.

Video decoder chipset 100 comprises a video decoder function 110.

The term "function" is used herein to denote a component of an entity (in this instance the video decoder chipset 100) that serves a given purpose. Such a component may be embodied in various different ways. For example, the component may be embodied in hardware and/or software. The component may comprise a processor, chip, integrated circuit or logic block. As such, a function may comprise an electronic component.

The video decoder function 110 is configured to decode encoded video data 114. The encoded video data 114 is received from one or more further entities. The encoded video data 114 may be received via a data communications network. Examples of data communications networks include, but are not limited to, the Internet and a Local Area Network (LAN). In some examples, the encoded video data 114 comprises streaming video data received via a data stream. The encoded video data 114 may be broadcast video data.

In some examples, the encoded video data 114 comprises VR video data. VR video data may be displayed closer to a viewer than other types of video data. The display resolution of VR video data may therefore be relatively high in order not to detract from user experience. For example, the display resolution of such VR video data may be 8K. 8K resolution refers to a horizontal resolution in the order of 8,000 pixels. In one specific example, video data having 8K resolution has a resolution of 7680×4320 pixels. VR video data may have a relatively high frame rate compared to other types of video data. For example, the frame rate of VR video data may be 120 frames per second, compared to 50 or 60 frames per second for some television broadcasts. Due to the high resolution and/or high frame rate of VR video data, relatively large amounts of data may be received, stored and/or processed when handling VR video data.

The encoded video data 114 is at a given level of quality. A given level of quality may correspond to a given resolution. In this example, the encoded video data 114 is 8K video data. Prior to being received by the video decoder chipset 100, the encoded video data 114 is derived by an encoder (not shown). For example, the encoder may encode original video data to derive the encoded video data 114.

The video decoder function 110 is configured to decode the encoded video data 114 to generate decoded video data 116. The video decoder function 110 is configured to output the decoded video data 116. In this example, the decoded video data 116 is at the same level of quality as the encoded video data 114. In this example, since the encoded video data 114 is 8K video data, the decoded video data 116 is also 8K video data.

In some examples, the video decoder function 110 is configured to decode streaming video data. In other examples, the video decoder function 110 is configured to decode an encoded video file. The encoded video file may be received from a memory of the computing device external to the video decoder chipset 100. The streaming video data or the encoded video file has a given frame rate. The video decoder function 110 is able to decode the streaming video data or the encoded video file with a given speed or rate. The speed or rate of decoding may vary based on the processing power of the video decoder function 110. If the video decoder function 110 is unable to decode the video data sufficiently quickly compared to the frame rate of the video data, a viewer may notice a loss in video quality.

The decoded video data 116 is stored in a memory 120. In this example, the memory 120 is comprised in the video decoder chipset 100. In other examples, the memory 120 is external to the video decoder chipset 100. For example, the memory 120 may be a central memory of a computing device within which the video decoder chipset 100 is located. The memory 120 may be arranged to store one or more decoded images, each image corresponding to a different frame in the decoded video data 116. In this example, each stored image is at the same level of quality as the decoded video data 116. In this example, since the decoded video data 116 is 8K video data, each stored image is an 8K image. The stored images may be successive images in the decoded video data 116.

The video decoder chipset 100 comprises a video shifter 130. A video shifter is a type of video display controller. The video shifter 130 may be configured to obtain the decoded video data 116 from the memory 120. In some examples, the video shifter 130 obtains the decoded video data 116 from the memory 120 via a processing unit. The processing unit may be arranged between the memory 120 and the video shifter 130. The processing unit may be arranged to receive the decoded video data 116 from the memory 120 and to send the decoded video data 116 to the video shifter 130. In some examples, the video shifter 130 obtains the decoded video data 116 from the memory 120 via one or more buses. The video shifter 130 may be configured to process the decoded video data 116 to generate a serial bitstream. A serial bitstream is a sequence of bits that represents the decoded video data 116. The generated serial bitstream may then be used to output a video signal. In some examples, the video shifter 130 is responsible for video timing signals. Video timing signals may be used to synchronise component video data. Component video data is video data that is split into two or more component channels. For example, video data may be split into separate colour channels.

While the example video decoder chipset 100 described above with reference to FIG. 1 may be used to obtain a relatively high resolution, 8K, video output, the video decoder chipset 100 relies on receiving encoded 8K video data 114 and having an 8K video decoder function 110 to decode the encoded 8K video data 114. An 8K video decoder function may, however, use more power and/or logic and/or may be more complicated and/or expensive to implement than a 4K video decoder function (which can decode encoded 4K video data, but which might not be able to decode encoded 8K video data). 4K resolution refers to a horizontal resolution in the order of 4,000 pixels. In one example, video data having 4K resolution has a resolution of 4096×2160 pixels. In another example, video data having a 4K resolution has a resolution of 3840×2160 pixels. Even for 4K video decoder functions that are capable of decoding 8K video data, decoding 8K video data may take a longer time than decoding 4K video data.

Furthermore, the video decoder chipset 100 stores the decoded 8K video data 116 in memory 120. Decoded 8K video data is larger, and therefore uses more storage space, than decoded 4K video data corresponding to the same original video data. Decoded 8K video data may have around four times as many pixels as decoded 4K video data, and therefore the storage space to store decoded 8K video data may be four times greater than the storage space to store decoded 4K video data. As such, even if a video decoder chipset having a 4K video decoder function were modified to have an 8K decoder function such that the video decoder chipset could decode 8K video data, the memory on such a chipset may have insufficient storage space to store the decoded 8K video data. Limited storage space may be particularly relevant when such a memory is comprised in a video decoder chipset. The physical size of the memory may be constrained by the relatively small form factor of the video decoder chipset compared to the form factor of the computing device in which the video decoder chipset, when in use, is located. Such a video decoder chipset, originally having a 4K video decoder function, could be modified to have an 8K decoder function and larger memory, but this may involve significant modification of the video decoder chipset.

Moreover, decoded 8K video data uses more memory bandwidth than comparative decoded 4K video data. Memory bandwidth relates to the connection via which a component such as a video shifter obtains the decoded video data from memory. The memory bandwidth of some 4K video decoder chipsets may be insufficient to handle decoded 8K video data in real time. The limited bandwidth between the video shifter and the memory could therefore cause a bottleneck which could affect the speed and efficiency of image processing and the visual quality of resulting images if a 4K video decoder chipset were modified to have some 8K functionality.

In contrast, examples described herein enable video having a relatively high level of quality, for example 8K video, to be reconstructed by a video decoder chipset using a video decoding function that does not decode the video data at the high level of quality. For example, the video decoder chipset may use a 4K video decoder function. By using a 4K video decoder function, an amount of power, logic, complexity and/or cost may be reduced compared to a case in which the video decoder function is an 8K video decoder function.

Further, examples described herein enable video having a relatively high level of quality, for example 8K video, to be reconstructed by a video decoder chipset while reducing the storage capacity, bandwidth and/or clock frequency of the memory used by the video decoder chipset compared to a video decoder chipset in which a video decoder function which decodes at the same level of quality as the output video data is used.

Figure 2:
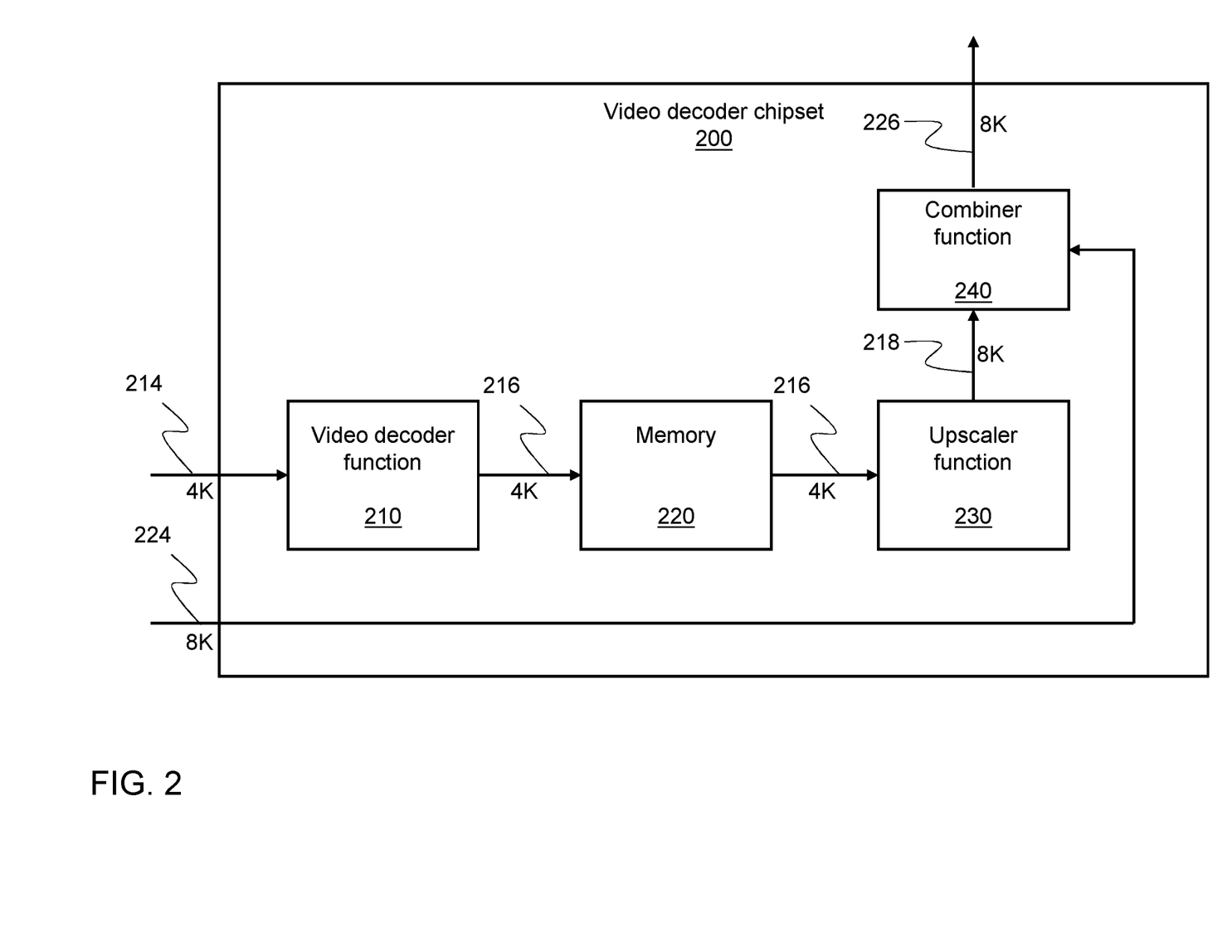
FIG. 2 shows a schematic block diagram of an example of a video decoder chipset in accordance with an embodiment of the present invention.

Referring to FIG. 2, there is shown schematically an example of a video decoder chipset 200.

The video decoder chipset 200 receives encoded video data 214 which may be in the form of an encoded video stream.

The video decoder chipset 200 comprises a video decoder function 210. The video decoder function 210 is configured to decode the encoded video data 214 to generate decoded video data 216. The decoded video data 216 is at a first level of quality. In this example, the first level of quality corresponds to a resolution of 4K. In other examples, the first level of quality corresponds to a resolution other than 4K.

The encoded video data 214 has been derived by an encoder using first video data that is at a second, higher level of quality. In this example, the second level of quality corresponds to a resolution of 8K. In other examples, the second level of quality corresponds to a resolution other than 8K. The encoder may be configured to derive the encoded video data 214 by downscaling (or 'downsampling') the first video data. Downscaling may be performed by averaging neighbouring pixel values in the first video data. In other examples, downscaling could involve other functions or calculations.

The video decoder function 210 is configured to output the decoded video data 216 for storage in a memory 220. In this example, the memory 220 is a memory of the video decoder chipset 200. In other examples, the memory 220 is external to the video decoder chipset 200.

The video decoder chipset 200 comprises an upscaler (or 'upsampler') function 230. The upscaler function 230 may be comprised in a video shifter of the video decoder chipset 200. For example, the upscaler function 230 may be embodied as a logic block in a video shifter of the video decoder chipset 200. The upscaler function 230 is configured to obtain the decoded video data 216 from the memory 220. The upscaler function 230 is further configured to upscale the decoded video data 216 to generate second video data 218 at the second level of quality. The second video data 218 is upscaled video data. Upscaling may involve upsampling the decoded video data 216.

An example of an upsampling operation is a Nearest Neighbour interpolation. Upscaling the decoded video data 216 involves increasing a resolution of the decoded video data 216. In this example, the resolution of the second video data 218 is 8K. As such, the resolution of the second video data 218, namely 8K, may be double the resolution of the decoded video data 216, namely 4K. In this example, doubling the resolution of the decoded video data 216 involves doubling (or approximately doubling) the number of pixels in both horizontal and vertical directions such that the overall number of pixels is four times (or approximately four times) the number of pixels in the decoded video data 216. In some examples, the number of pixels in one direction is doubled (or approximately doubled) but the number of pixels in the other direction is maintained between the decoded video data 216 and the second video data 218.

In some examples, the upscaler function 230 outputs the second video data 218 to a memory. The memory may be external to the video decoder chipset 200. The memory may be the same as or different from the memory 220. In some examples, the upscaler function 230 outputs the second video data 218 to a framebuffer. A framebuffer is a portion of memory containing a bitmap that drives a video display. In some examples, the upscaler function 230 outputs a portion of the second video data 218 to a memory or a framebuffer. For example, the second video data 218 may be generated and/or output on a tile-by-tile basis, where a tile corresponds to a group of pixels within an image.

The video decoder chipset 200 further comprises a combiner function 240. In some examples, the combiner function 240 is comprised in a video shifter of the video decoder chipset 200. For example, the combiner function 240 may be embodied as a logic component of the video shifter. In other examples, the combiner function 240 is separate from the video shifter. The combiner function 240 may be embodied as hardware and/or software.

The combiner function 240 is configured to receive the second video data 218. In some examples, the combiner function 240 is configured to receive the second video data 218 from the upscaler function 230. In some examples, for example where the combiner function 240 is separate from a video shifter, the combiner function 240 is configured to receive the second video data 218 from the video shifter.

The combiner function 240 is configured to obtain residual data 224. The combiner function 240 uses the residual data 224 and the second video data 218 to reconstruct the first video data, as will be explained in more detail below. In some examples, the combiner function 240 is configured to receive the residual data 224 in an encoded form. The combiner function 240 may comprise residual decoder functionality arranged to decode the encoded residual data. In some examples, the combiner function 240 is arranged to receive the residual data 224 in an unencoded or a decoded form. The residual data 224 may be received by the video decoder chipset 200 via a data stream. The residual data 224 is derived based on the first video data and the second video data 218. The residual data 224 may be indicative of a difference between the first video data and the second video data 218. In other words, the residual data 224 may be indicative of information that is lost as a result of downscaling the first video data and then upscaling the decoded video data 216. The residual data 224 is derived by the encoder. The encoder may be configured to derive the residual data 224 by downscaling the first video data to obtain downscaled video data and then upscaling the downscaled video data to obtain a preliminary representation of the first video data. The residual data 224 may be obtained by determining a difference between the first video data and the preliminary representation. Since the first video data and the preliminary representation are both at the second level of quality, the residual data 224 is also at the second level of quality. In this example, the residual data 224 is 8K residual data.

The reader is referred to international patent application no. PCT/EP2013/059847, which relates to deriving residual data such as that described above. The entire contents of international patent application no. PCT/EP2013/059847 are incorporated herein by reference.

The combiner function 240 is configured to combine the second video data 218 with the residual data 224 to generate enhanced video data 226. The combiner function 240 is configured to output the enhanced video data 226. The enhanced video data 226 may be output for processing by a video display function (not shown). The video display function may be comprised in a further entity. For example, the video display function may be comprised in a display device.

The enhanced video data 226 is a reconstruction of the first video data. In some examples, the enhanced video data 226 is an exact reconstruction of the first video data. In some examples, the enhanced video data 226 is not an exact reconstruction of the first video data. The enhanced video data 226 may not be an exact reconstruction of the first video data due to, for example, quantisation of the residual data 224. The enhanced video data 226 has the same level of quality as the first video data, in this example 8K, and compensates for losses due to downscaling and upscaling through the use of residual data 224. The enhanced video data 226 may therefore be considered to be a more accurate representation of the first video data compared with the upscaled video data 118 described with reference to FIG. 1 above, which is not combined with residual data 224. The enhanced video data 226 is obtained using a 4K video decoder function instead of an 8K video decoder function. Further, the decoded video data 216 that is stored in and obtained from the memory 220 is 4K video data instead of 8K video data, thus reducing the required storage and/or memory bandwidth compared to a case where 8K video data is stored. The memory 220 may have insufficient storage capacity to store the enhanced video data 226 but the video decoder chipset 200 nevertheless allows 8K video data to be obtained.

A 4K video decoder chipset (having a video decoder function and memory that are configured to handle 4K video data) may be improved so as to generate an enhanced 8K output. For example, a 4K video decoder chipset may be upgraded or modified to obtain this enhanced functionality. Upgrading of such a 4K video decoder chipset may comprise providing the video decoder chipset with the combiner function 240 and a path for the residual data 224. Such an upgrade may be simpler and/or more cost-effective than replacing the 4K video decoder function 210 and the memory 220 of a 4K video decoder chipset with an 8K video decoder function and larger memory such that it can handle 8K video data. By reusing the 4K video decoder function 210 and the memory 220 of the 4K video decoder chipset instead of replacing them with an 8K video decoder function and larger memory respectively, electrical waste may be reduced.

In some examples, the combiner function 240 is configured to receive and use synchronisation data. The synchronisation data is useable to synchronise the second video data 218 with the residual data 224. In some examples, the second video data 218 comprises a set of images and the residual data 224 comprises a respective set of residuals for each image. The synchronisation data is used to align the set of residuals with its respective image such that the correct image is enhanced with the correct residual data.

Figure 3:
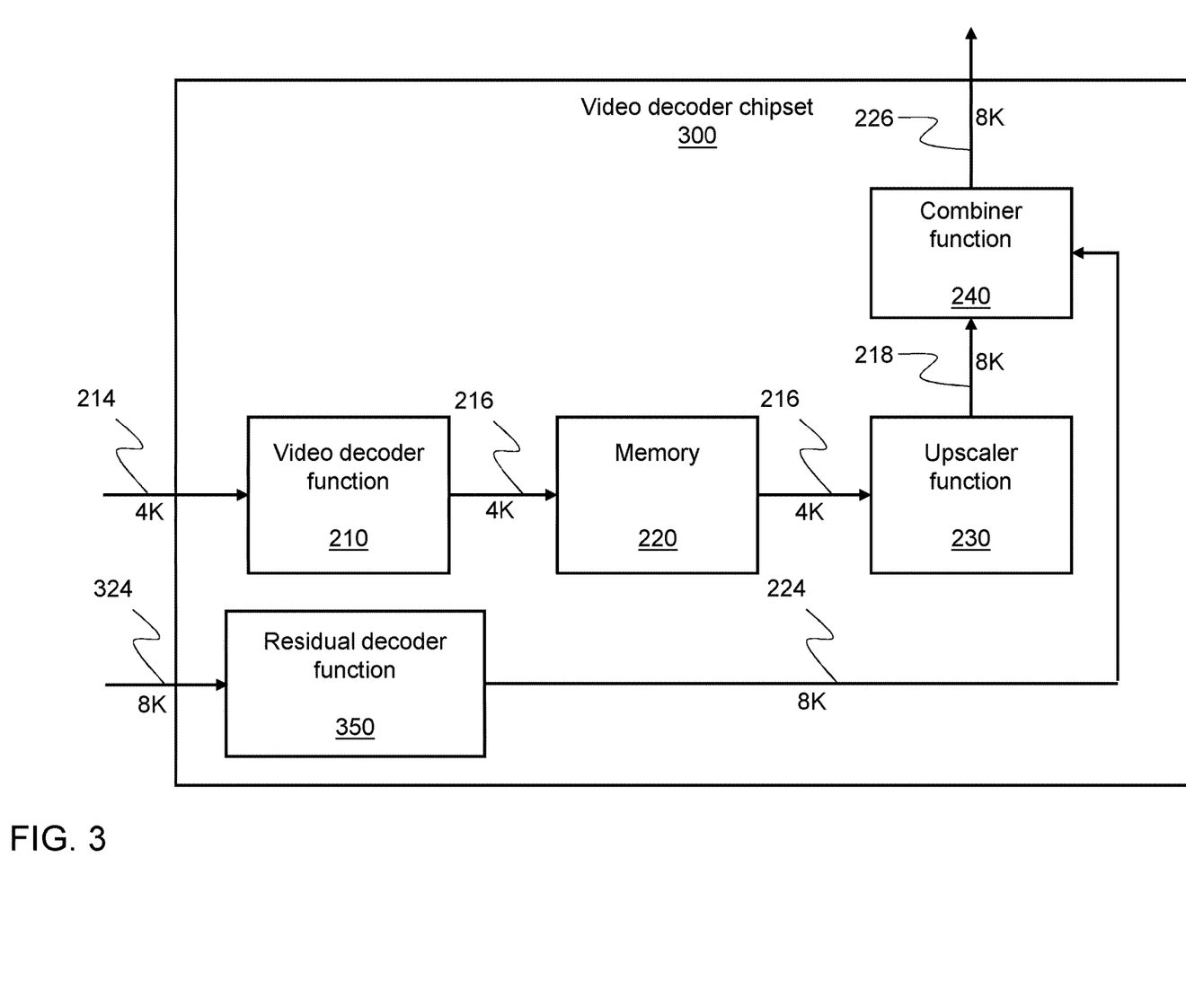
FIG. 3 shows a schematic block diagram of another example of a video decoder chipset in accordance with an embodiment of the present invention.

Referring to FIG. 3, there is shown schematically another example of a video decoder chipset 300.

The video decoder chipset 300 comprises video decoder function 210, upscaler function 230 and combiner function 240. The video decoder chipset 300 further comprises a residual decoder function 350.

Residual decoder function 350 is configured to decode encoded residual data 324. The encoded residual data 324 may be received via a data stream. In this example, the encoded residual data 324 and the encoded video data 214 are received via separate data streams. In other words, the encoded video data 214 is received by the video decoder chipset 300 via a first data stream, and the encoded residual data 324 is received by the video decoder chipset 300 via a second, different data stream. The first data stream and the second data stream may be received from different devices and/or may be received at different times. In other examples, the encoded video data 214 and the encoded residual data 324 are received by the video decoder chipset 300 via a single data stream. For example, the encoded video data 214 and the encoded residual data 324 may be multiplexed onto the same data stream. Using a single data stream may use fewer transmission resources than using multiple data streams. However, multiplexing the encoded video data 214 and the encoded residual data 324 into a single data stream may involve the video decoder chipset 300 having demultiplexing functionality to demultiplex the encoded video data 214 and the encoded residual data 324. In this example, the residual decoder function 350 is separate from the video decoder function 210 in the sense that it is a separate logical and/or physical component of the video decoder chipset 300.

Decoding of the encoded video data 214 by the video decoder function 210 may therefore be performed in parallel with decoding of the encoded residual data 324 by the residual decoder function 350. In other words, decoding of the encoded video data 214 and decoding of the encoded residual data 324 may be performed at the same time. By using a residual decoder function 350 that is separate from the video decoder function 210, an existing 4K decoder function that is capable of decoding 4K video data but not capable of decoding residual data may be used to decode the encoded video data 214 and a separate component, in this example the residual decoder function 350, can be used to decode the encoded residual data 324.

Decoding the encoded residual data 324 generates the residual data 224 that is used by the combiner function 240. The residual decoder function 350 is configured to output the residual data 224 to the combiner function 240. Outputting the residual data 224 to the combiner function 240 enables the combiner function 240 to combine the residual data 224 with the second video data 218 to generate the enhanced video data 226.

In some examples, the residual decoder function 350 is comprised in a video shifter of the video decoder chipset 300. For example, the video shifter may comprise one or more of the upscaler function 230, combiner function 240 and residual decoder function 350. In other examples, the residual decoder function 350 is separate from a video shifter of the video decoder chipset 300.

Figure 4:
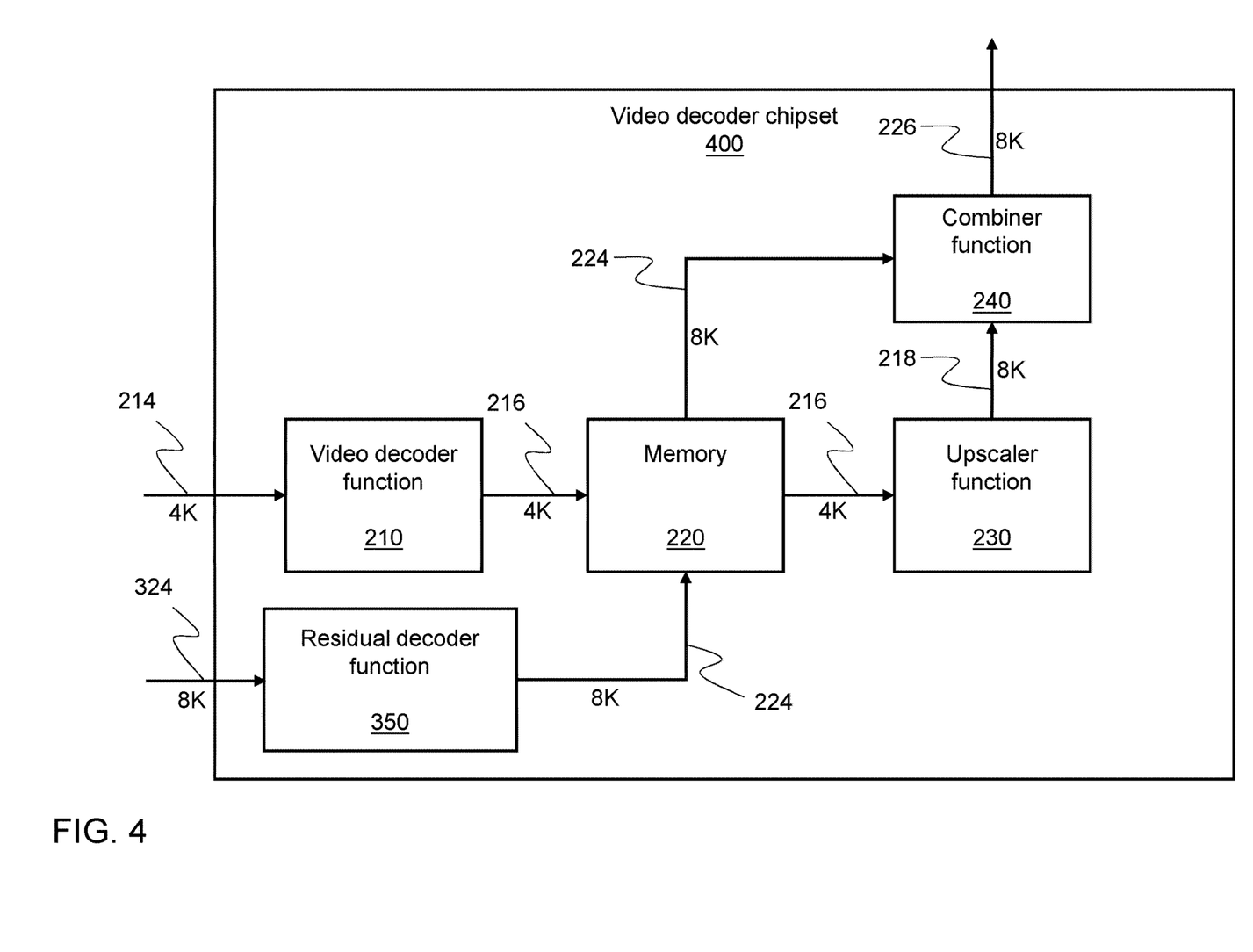
FIG. 4 shows a schematic block diagram of another example of a video decoder chipset in accordance with an embodiment of the present invention.

Referring to FIG. 4, there is shown schematically another example of a video decoder chipset 400.

Video decoder chipset 400 comprises video decoder function 210, upscaler function 230, combiner function 240 and residual decoder function 350.

In this example, residual decoder function 350 is configured to decode encoded residual data 324 and to output the decoded residual data 224 for storage in memory 220. This differs from the example video decoder chipset 300 described above with reference to FIG. 3 in which the residual decoder function 350 provided the residual data 224 directly to the combiner function 240. Each decoded image stored in the memory 220 may have corresponding a corresponding set of residual data also stored in the memory 220. For example, residual data corresponding to a given decoded image may be stored along with that given decoded image. The combiner function 240 may be arranged to receive the given decoded image and its corresponding set of residual data from the memory 220 simultaneously, thereby facilitating the generating of the corresponding enhanced image. As described above, memory 220 may be comprised in the video decoder chipset 400 or may be separate from the video decoder chipset 400. The memory 220 may therefore be configured to store both the decoded video data 216 and the decoded residual data 224.

In this example, the combiner function 240 is configured to obtain the residual data 224 by receiving the residual data 224 from the memory 220.

The storage space used to store both the decoded video data 216 (at the first, lower level of quality) and the decoded residual data 224 is less than the storage space that would be used to store the second video data 218 (at the second, higher level of quality). Therefore memory requirements may be reduced, even where residual data 224 is stored in the memory 220, compared to a case in which 8K video data is decoded by an 8K video decoder function and stored in memory.

Figure 5:
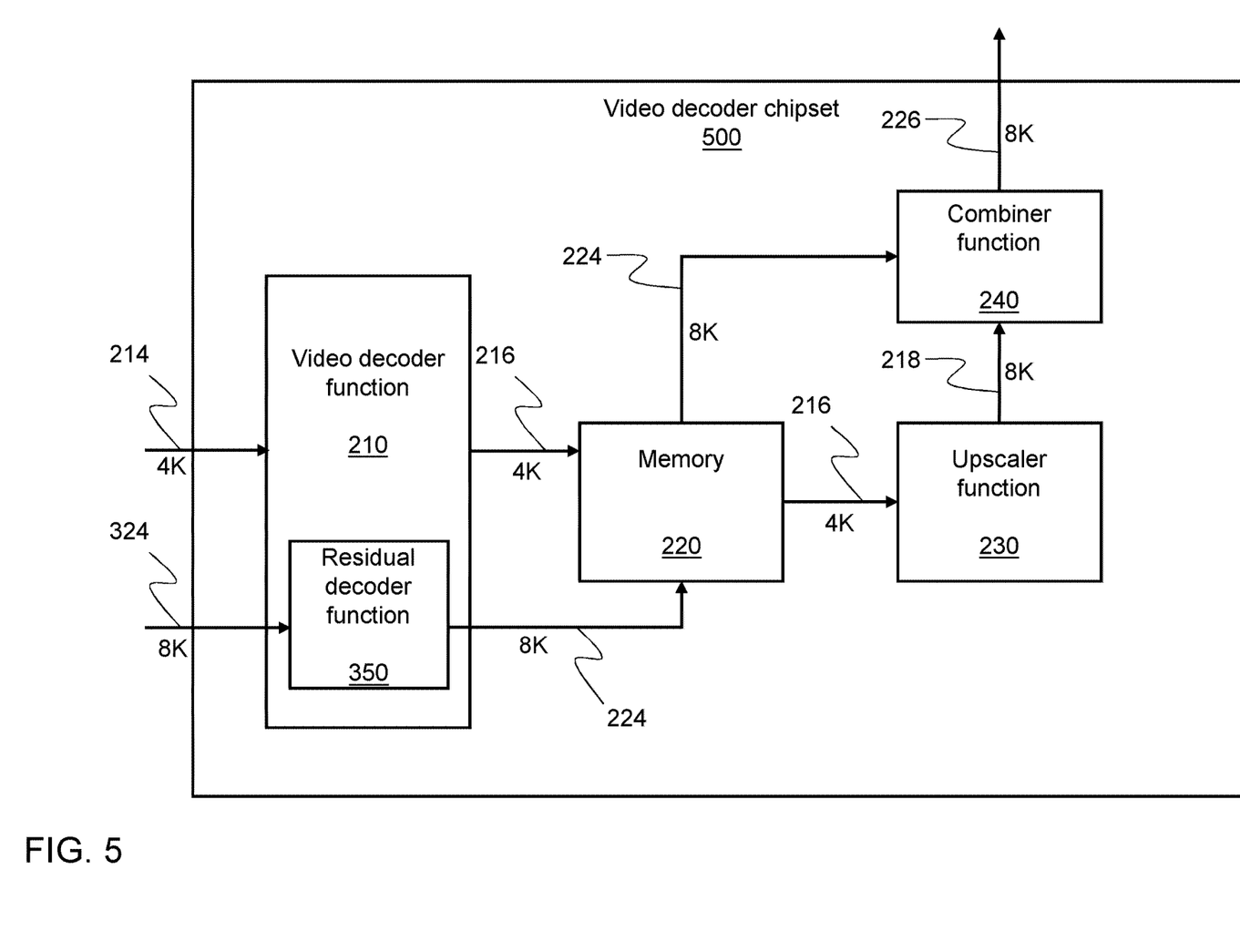
FIG. 5 shows a schematic block diagram of another example of a video decoder chipset in accordance with an embodiment of the present invention.

Referring to FIG. 5, there is shown schematically another example of a video decoder chipset 500.

Video decoder chipset 500 comprises video decoder function 210, upscaler function 230, combiner function 240 and residual decoder function 350.

In this example, the residual decoder function 350 is comprised in the video decoder function 210. The residual decoder function 350 may be embodied as a logic component of the video decoder function 210. The video decoder function 210 in this example may therefore be considered to be a combined video and residual decoder function. As such, fewer individual components may be used in video decoder chipset 500 compared, for example, to the example video decoder chipset 400 described above with reference to FIG. 4.

In this example, the video decoder chipset 500 is configured to receive the encoded video data 214 and the encoded residual data 324 via the same data stream. For example, the encoded video data 214 and the encoded residual data 324 may be multiplexed into a single data stream.

In some examples, enhanced video data is generated by combining upscaled video data with residual data. Residual data is an example of reconstruction data. Another example of reconstruction data is motion compensation data. Motion compensation data is data that exploits temporal correlation between different images (for example frames) in a video. The motion compensation data may compensate for motion of one or more items across different frames in the video. In some examples, the video decoder chipset receives motion compensation data. A combiner function of the video decoder chipset may be arranged to combine the motion compensation data with a first frame of a video to obtain a second frame of the video. The first frame may be a previous frame in the video relative to the second frame. The combiner function may receive the first frame from memory. The video decoder chipset may receive the motion compensation data in an encoded form and may comprise a motion compensation data decoder function to decode the encoded motion compensation data. The motion compensation data decoder function may be part of or separate from one or more of a video decoder function, a residual decoder function and a video shifter of the video decoder chipset.

In some examples, the video decoder chipset receives correction data. Correction data can be used to correct for errors in encoding and decoding video data. Correction data may be derived by an encoder, for example by encoding first video data, decoding the encoded video data, and comparing the decoded video data with the first video data. The correction data may be received by the video decoder chipset in an encoded form. As such, the video decoder chipset may comprise a correction data decoder function arranged to decode the encoded correction data. The correction data decoder function may be part of or separate from one or more of a residual decoder function, a video decoder function and a video shifter of the video decoder chipset. A correction data combiner function of the video decoder chipset may be arranged to combine the correction data with decoded video data to obtain corrected video data. The corrected video data may be upscaled by an upscaler function of the video decoder chipset before being combined with residual data to obtain enhanced video data.

In examples described above, a video decoder chipset decodes 4K video data and outputs enhanced 8K video data. In other examples, other resolutions are used instead of 4K and 8K.

The above embodiments are to be understood as illustrative examples. Further embodiments are envisaged.

In examples described above, a video decoder chipset comprises various components. In some examples, one or more of the components are arranged externally to the video decoder chipset.

Various measures (for example video decoder chipsets, methods and computer programs) are provided in which a video decoder chipset comprises a video decoder function configured to decode encoded video data to generate decoded video data at a first level of quality, the encoded video data having been derived by an encoder using first video data at a second, higher level of quality. The video decoder function is configured to output the decoded video data for storage in a memory. The video decoder chipset comprises an upscaler function configured to obtain the decoded video data from the memory. The upscaler function is configured to upscale the obtained decoded video data to generate second video data at the second level of quality. The video decoder chipset comprises a combiner function configured to obtain residual data, the residual data having been derived by the encoder based on the first video data and the second video data. The combiner function is configured to combine the second video data with the residual data to generate enhanced video data. The combiner function is configured to output the enhanced video data.

In some examples, the video decoder chipset comprises a residual decoder function. The residual decoder function is configured to receive encoded residual data and decode the received encoded residual data to generate the residual data. Using encoded residual data reduces an amount of data transmitted to and received by the video decoder chipset, compared to a case in which unencoded residual data is used.

In some examples, the video decoder chipset is configured to receive the encoded video data via a first data stream and is configured to receive the encoded residual data via a second, different data stream. Receiving the encoded video data and the encoded residual data via separate data streams enables the encoded video data and the encoded residual data to be received at different times and/or from different devices, and does not involve the video decoder chipset having demultiplexing functionality.

In some examples, the video decoder chipset is configured to receive the encoded video data and the encoded residual data via the same data stream. Receiving the encoded video data and the encoded residual data via the same data stream reduces an amount of transmission resources used compared to a case in which the encoded video data and the encoded video data are received via separate data streams.

In some examples, the residual decoder function is separate from the video decoder function. The residual decoder function being separate from the video decoder function enables an existing video decoder function to be re-used instead of replaced with a video decoder function that has residual decoder functionality, thereby reducing electrical waste compared to a case in which the residual decoder function is comprised in the video decoder function.

In some examples, the residual decoder function is comprised in the video decoder function. The residual decoder function being comprised in the video decoder function reduces an amount of components of the video decoder chipset, and therefore the complexity of the video decoder chipset, compared to a case in which the residual decoder function is separate from the video decoder function.

In some examples, the residual decoder function is configured to output the residual data to the combiner function. In some examples, the combiner function is configured to receive the residual data from the residual decoder function. Configuring the residual decoder function to output the residual data to the combiner function facilitates the enhancing of video data by the combiner function.

In some examples, the residual decoder function is configured to output the residual data for storage in the memory. In some examples, the combiner function is configured to receive the residual data by receiving the residual data from the memory. Storing the residual data in the memory enables particular sets of residual data to be matched with corresponding frames of the decoded video data, thereby facilitating the enhancing of the video data.

In some examples, the video decoder chipset comprises a video shifter. The video shifter enables the video decoder chipset to output a video signal for display.

In some examples, the residual decoder function is comprised in the video shifter. The residual decoder function being comprised in the video shifter reduces a number of components of the video decoder chipset, and therefore the complexity of the video decoder chipset, compared to a case in which the residual decoder function is separate from the video shifter.

In some examples, the upscaler function is comprised in the video shifter. The upscaler function being comprised in the video shifter reduces a number of components of the video decoder chipset, and therefore the complexity of the video decoder chipset, compared to a case in which the upscaler function is separate from the video shifter.

In some examples, the combiner function is separate from the video shifter. The combiner function being separate from the video shifter enables an existing video shifter to be re-used instead of replaced, thereby reducing electrical wastage compared to a case in which a replacement video shifter is used.

In some examples, the combiner function is configured to receive the second video data from the video shifter. Configuring the combiner function to receive the second video data from the video shifter facilitates the generating of the enhanced video data by the combiner function.

In some examples, the combiner function is comprised in the video shifter. The combiner function being comprised in the video shifter reduces a number of components of the video decoder chipset, and therefore the complexity of the video decoder chipset, compared to a case in which the combiner function is separate from the video shifter.

In some examples, the combiner function is configured to receive synchronisation data useable to synchronise the second video data with the residual data. The combiner function is configured to use the synchronisation data to synchronise the second video data with the residual data. Synchronising the second video data with the residual data using synchronisation data facilitates the combining of the second video data with the residual data, thereby facilitating the generating of the enhanced video data. The synchronisation data enables a given image to be enhanced with its corresponding residual data.

In some examples, the residual data is indicative of a difference between the first video data and the second video data, the residual data being useable to reconstruct the first video data using the second video data. As such, combining the residual data with the second video data enables a more accurate representation of the first video data to be obtained by the video decoder chipset, compared to a case in which residual data is not used and the second video data is itself output.

In some examples, the resolution of the second video data is double the resolution of the decoded video data. As such, the resolution of the video data may be increased by the video decoder chipset after decoding of the video data, thereby reducing an amount of processing power, logic, storage space used, complexity and/or cost compared to a case in which the higher resolution video data is itself decoded.

In some examples, the resolution of the decoded video data is 4K. As such, a 4K video decoder function may be used by the video decoder chipset. A 4K video decoder function may use less power and/or logic and/or be less expensive than a video decoder function that is capable of decoding higher quality video data.

In some examples, the resolution of the second video data is 8K. As such, enhanced 8K video may be output by the video decoder chipset, thereby providing a high level of visual quality and definition, even when such a video is displayed close to a viewer.

In some examples, the memory has insufficient storage space to store the enhanced video data. By decoding the video data at the first, lower level of quality and storing the decoded video data in the memory prior to enhancing it, an amount of storage space used to store the decoded video data is reduced compared to a case in which video data at the second, higher level of quality is decoded and stored in the memory. Therefore, enhanced video data at the second level of quality may be output by the video decoder chipset when there is limited storage capacity in the memory.

In some examples, the combiner function is configured to output the enhanced video data for processing by a video display function. Configuring the combiner function to output the enhanced video for data processing by a video display function enables the video display function to display a video with a high level of visual quality and definition, even when such a video is displayed close to a viewer.

In some examples, the encoded video data is virtual reality video data. Virtual reality video data has a relatively high resolution and/or frame rate compared to some other types of video data. As such, enhanced virtual reality video data may be output by the video decoder chipset using less processing power, logic, storage, processing time and/or cost compared to a case in which virtual reality video data is decoded and stored at its full resolution.

Various measures (for example video decoder chipsets, methods and computer programs) are provided in which a video decoder chipset comprises a 4K video decoder function configured to receive encoded 4K video data, the encoded 4K video data having been derived by an encoder device using first 8K video data. The 4K video decoder function is configured to decode the received encoded 4K video data to generate decoded 4K video data. The 4K video decoder function is configured to output the decoded 4K video data. The video decoder chipset further comprises a 4K-to-8K upscaler function. The 4K-to-8K upscaler function is configured to obtain the decoded 4K video data and upscale the obtained 4K decoded video data to generate second 8K video data. The video decoder chipset further comprises a combiner function. The combiner function is configured to obtain residual data, the residual data having been derived by the encoder device based on the first 8K video data and video data corresponding to the second 8K video data. The combiner function is configured to combine the second 8K video data with the residual data to generate third 8K video data. The combiner function is configured to output the third 8K video data. In some examples, a video decoder chipset is modified. The video decoder chipset comprises a video decoder function and an upscaler function. The video decoder function is configured to decode encoded video data to generate decoded video data at a first level of quality, the encoded video data having been derived by an encoder using first video data at a second, higher level of quality. The video decoder function is configured to output the decoded video data for storage in a memory. The upscaler function is configured to obtain the decoded video data from the memory. The upscaler function is further configured to upscale the decoded video data to generate second video data at the second level of quality. Modifying the video decoder chipset comprises providing the video decoder chipset with a combiner function. The combiner function is configured to obtain residual data derived based on the first video data and the second video data. The combiner function is further configured to combine the second video data with the residual data to generate enhanced video data. The combiner function is further configured to output the enhanced video data. In some examples, modifying the video decoder chipset comprises providing the video decoder chipset with memory to store the residual data. In some examples, the combiner function is configured to receive synchronisation data useable to synchronise the second video data with the residual data. The combiner function may synchronise the second video data with the residual data using the synchronisation data. The techniques described herein may be implemented in software and/or hardware. They may include configuring a video decoder chipset to carry out and/or support any or all of the techniques described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:
1. A video decoder chipset comprising:
a video decoder function configured to:
   decode encoded video data to generate decoded video data at a first level of quality, the encoded video data having been derived by an encoder using first video data at a second, higher level of quality;
an upscaler function configured to:
   obtain the decoded video data; and
   upscale the obtained decoded video data to generate second video data at the second level of quality; and
a combiner function configured to:
   obtain residual data, the residual data having been derived by the encoder by upscaling a downscaled version of the first video data to obtain a preliminary version of the first video data and comparing the first video data with the preliminary version of the first video data;
combine the second video data with the residual data to generate enhanced video data; and
output the enhanced video data.

2. A video decoder chipset according to claim 1, comprising a residual decoder function configured to:
receive encoded residual data; and
decode the received encoded residual data to generate the residual data.

3. A video decoder chipset according to claim 2, wherein the video decoder chipset is configured to receive the encoded video data via a first data stream and is configured to receive the encoded residual data via a second, different data stream.

4. A video decoder chipset according to claim 2, wherein the video decoder chipset is configured to receive the encoded video data and the encoded residual data via the same data stream.

5. A video decoder chipset according to claim 2, wherein the residual decoder function is separate from the video decoder function.

6. A video decoder chipset according to claim 2, wherein the residual decoder function is comprised in the video decoder function.

7. A video decoder chipset according to claim 2, wherein the residual decoder function is configured to output the residual data to the combiner function, and wherein the combiner function is configured to receive the residual data from the residual decoder function.

8. A video decoder chipset according to claim 2, wherein the residual decoder function is configured to output the residual data for storage in the memory, and wherein the combiner function is configured to receive the residual data by receiving the residual data from the memory.

9. A video decoder chipset according to claim 2, comprising a video shifter.

10. A video decoder chipset according to claim 9, wherein one or more of the residual decoder and the upscaler function are comprised in the video shifter.

11. A video decoder chipset according to claim 9, wherein the combiner function is separate from the video shifter.

12. A video decoder chipset according to claim 9, wherein the combiner function is configured to receive the second video data from the video shifter.

13. A video decoder chipset according to claim 9, wherein the combiner function is comprised in the video shifter.

14. A video decoder chipset according to claim 1, wherein the combiner function is configured to:
receive synchronisation data useable to synchronise the second video data with the residual data; and
use the synchronisation data to synchronise the second video data with the residual data.

15. A video decoder chipset according to claim 1, wherein the residual data is indicative of a difference between the first video data and the second video data, the residual data being useable to reconstruct the first video data using the second video data.

16. A video decoder chipset according to claim 1, wherein the memory has insufficient storage space to store the enhanced video data.

17. A video decoder chipset according to claim 1, wherein the combiner function is configured to output the enhanced video data for processing by a video display function.

18. A video decoder chipset according to claim 1, wherein the encoded video data is virtual reality video data.

19. A method of processing video data in a video decoder chipset, the video decoder chipset comprising a video decoder function, an upscaler function and a combiner function, the method comprising:
decoding, by the video decoder function, encoded video data to generate decoded video data at a first level of quality, the encoded video data having been derived by an encoder using first video data at a second, higher level of quality;
outputting, by the video decoder function, the decoded video data for storage in a memory;
obtaining, by the upscaler function, the decoded video data from the memory;
upscaling, by the upscaler function, the obtained decoded video data to generate second video data at the second level of quality;
receiving, by the combiner function, residual data, the residual data having been derived by the encoder by upscaling a downscaled version of the first video data to obtain a preliminary version of the first video data and comparing the first video data with the preliminary version of the first video data;
combining, by the combiner function, the second video data with the residual data to generate enhanced video data; and
outputting, by the combiner function, the enhanced video data.

20. A video decoder chipset comprising:
a 4K video decoder function configured to:
receive encoded 4K video data, the encoded 4K video data having been derived by an encoder device using first 8K video data;
decode the received encoded 4K video data to generate decoded 4K video data; and
output the decoded 4K video data;
a 4K-to-8K upscaler function configured to:
obtain the decoded 4K video data; and
upscale the obtained 4K decoded video data to generate second 8K video data; and
a combiner function configured to:
obtain residual data, the residual data having been derived by the encoder device by upscaling a downscaled version of the first 8K video data to obtain a preliminary version of the first 8K video data and comparing the first 8K video data with the preliminary version of the first 8K video data;
combine the second 8K video data with the residual data to generate third 8K video data; and
output the third 8K video data.

* * * * *